(12) United States Patent
Lee

(10) Patent No.: US 10,707,701 B2
(45) Date of Patent: Jul. 7, 2020

(54) OPTICAL DISK DRIVE FOR WIRELESS POWER TRANSMISSION

(71) Applicant: HITACHI-LG DATA STORAGE KOREA, INC., Seoul (KR)

(72) Inventor: Sangjae Lee, Seoul (KR)

(73) Assignee: HITACHI-LG DATA STORAGE KOREA, INC., Seoul (KR)

(*) Notice: Subject to any disclaimer, the term of this patent is extended or adjusted under 35 U.S.C. 154(b) by 231 days.

(21) Appl. No.: 15/994,463

(22) Filed: May 31, 2018

(65) Prior Publication Data
US 2018/0351408 A1 Dec. 6, 2018

(30) Foreign Application Priority Data

Jun. 1, 2017 (KR) .................. 10-2017-0068574

(51) Int. Cl.
| | |
|---|---|
| H01F 38/00 | (2006.01) |
| H02J 50/12 | (2016.01) |
| H01F 38/14 | (2006.01) |
| H02J 7/02 | (2016.01) |
| G11B 13/04 | (2006.01) |
| G11B 7/12 | (2012.01) |
| H02J 50/80 | (2016.01) |
| H02J 7/34 | (2006.01) |

(52) U.S. Cl.
CPC ............. *H02J 50/12* (2016.02); *G11B 7/12* (2013.01); *G11B 13/04* (2013.01); *H01F 38/14* (2013.01); *H02J 7/025* (2013.01); *G11B 2220/20* (2013.01); *H02J 7/342* (2020.01); *H02J 50/80* (2016.02)

(58) Field of Classification Search
USPC ........................................................ 307/104
See application file for complete search history.

(56) References Cited

U.S. PATENT DOCUMENTS

2011/0241614 A1* 10/2011 Yeh .................. H02J 7/0027
    320/108
2014/0139034 A1* 5/2014 Sankar .................. H02J 50/40
    307/104

* cited by examiner

*Primary Examiner* — Rexford N Barnie
*Assistant Examiner* — Dru Parries
(74) *Attorney, Agent, or Firm* — Birch, Stewart, Kolasch & Birch, LLP

(57) ABSTRACT

Disclosed is an optical disk drive for wireless power transmission. The optical disk drive in an embodiment of the present invention comprises a tray on which a optical disk is to be seated; a driving unit for rotating the optical disk to be seated on the tray and reading or writing the optical disk; a wireless power transmitting module to be seated on the tray and comprising a primary coil and a transmitting circuit unit; a power supply unit for supplying power; and a controller for controlling the power supply unit to supply power to the wireless power transmitting module when determining that the wireless power transmitting module is seated on the tray.

10 Claims, 9 Drawing Sheets

A – A'

OPTICAL DISK DRIVE FOR WIRELESS POWER TRANSMISSION

This application claims the benefit of priority under 35 U.S.C. § 119(a) to Korean Patent Application No. 10-2017-68574 filed on Jun. 1, 2017, which is incorporated by reference herein in its entirety.

BACKGROUND

Field

The present invention relates to an optical disk drive for wireless power transmission, and more particularly, to an wireless power transmission module that transmits power wirelessly by placing the wireless power transmission module on an optical disk drive mounted on a laptop computer.

Related Art

With the development of communication and information processing technology, use of smart terminals such as a smart phone, and the like has gradually increased and at present, a charging scheme generally applied to the smart terminals is a scheme that directly connects an adapter connected to a power supply to the smart terminal to charge the smart phone by receiving external power or connects the adapter to the smart terminal through a USB terminal of a host to charge the smart terminal by receiving USB power.

In recent years, in order to reduce inconvenience that the smart terminal needs to be directly connected to the adapter or the host through a connection line, a wireless charging scheme that wirelessly charges a battery by using magnetic coupling without an electrical contact has been gradually applied to the smart terminal. It is important to spread a lot of wireless power transmission apparatuses capable of charging such devices to create an environment in which the apparatuses can be used anytime and anywhere.

However, when the wireless power transmission apparatus uses external power, the wireless power transmission apparatus must be connected to an outlet provided on the wall for power supply. So, there is a possibility that the smart terminal may be out of the reach of the user's hand and there is a risk of loss or a restriction on the immediate use of the smart terminal.

Further, in case the wireless power transmission apparatus uses the USB power of a host such as a laptop computer (or a notebook computer) or a desktop computer, since it is connected to the computer via a USB cable, the laptop computer occupies space, the USB cable is messy and it is inconvenient to have to move the laptop computer as well as the wireless power transmission apparatus, the USB cable, and the smart terminal together.

In view of this situation, when a laptop computer is equipped with a function of wirelessly charging a smart terminal, it is possible to charge the smart terminal even during meetings or work with the laptop computer, which can be very useful in terms of user convenience.

However, in the case of the laptop computer, it is difficult to mount a wireless power transmission module therein because of its limited size and complicated functions.

SUMMARY

Accordingly, the present invention has been made in view of such circumstances, and it is an object of the present invention to provide a wireless power transmission function to a laptop computer equipped with an optical disk drive.

In accordance with an embodiment of the present invention, an optical disk drive for wireless power transmission comprises: a tray on which a optical disk is to be seated; a driving unit for rotating the optical disk to be seated on the tray and reading or writing the optical disk; a wireless power transmitting module to be seated on the tray and comprising a primary coil and a transmitting circuit unit; a power supply unit for supplying power; and a controller for controlling the power supply unit to supply power to the wireless power transmitting module when determining that the wireless power transmitting module is seated on the tray.

In an embodiment, the controller may control the power supply unit to supply power to the wireless power transmitting module only when the tray is open in a state in which the wireless power transmitting module is seated on the tray.

In an embodiment, the controller may control the driving unit to drive a spindle motor to rotate an object seated on the tray, and determine whether the wireless power transmitting module is seated on the tray based on a signal reflected from the object and a second signal generated from the spindle motor.

In an embodiment, the controller may determine whether the wireless power transmitting module is seated on the tray only in a state in which the tray is closed.

In an embodiment, the wireless power transmitting module may comprise a reflection area for reflecting a light emitted from an optical pick-up at a predetermined thickness from a surface contacting the tray when the wireless power transmitting module is seated on the tray.

In an embodiment, the reflection area may be formed in a predetermined radial range and a predetermined tangential angle range in which an objective lens included in the optical pick-up is placed when the optical pick-up moves most inward.

In an embodiment, the wireless power transmitting module may comprise a clamp hole a diameter of which is larger than that of a clamp of the spindle motor.

In an embodiment, the wireless power transmitting module may comprise a first connector for receiving power which protrudes from a surface contacting the tray, a tray may be provided with a tray hole in a position corresponding to the first connector, and a second connector may be mounted on a circuit board disposed below the tray to face the tray so as to engage the first connector.

In an embodiment, the wireless power transmitting module may comprise a first connector for receiving power which protrudes from a surface contacting the tray, a tray may be provided with a tray hole in a position corresponding to the first connector, a second connector may be mounted on a circuit board disposed below the tray to face the tray so as to engage the first connector, and each of the first and second connectors may include a recognition pin, and wherein when the tray is closed, the controller may control the power supply unit to supply power to the second pin, and determine that the wireless power transmitting module is seated on the tray if identification information is received from the recognition pin.

In an embodiment, when the tray is open in a state in which the wireless power transmitting module is seated on the tray, the controller may control the power supply unit to supply power to the wireless power transmitting module via the second connector.

In an embodiment, the optical disk drive may be built into a laptop computer

Accordingly, the wireless charging function is implemented using a wireless power transmitting module detachably mounted on a tray of an optical disk drive mounted on a laptop computer, thereby improving user convenience.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Hereinafter, embodiments of an optical disk drive for wireless power transmission according to the present invention will be described in detail with reference to the accompanying drawings.

Recently, as a USB memory and a data streaming technology have greatly developed, the frequency of use of an optical disk drive (ODD) has been considerably reduced compared to the past. The ODD mounted on a laptop computer operates with an optical disk loaded on a tray on which a spindle motor is mounted.

Accordingly, when the tray space on which the optical disk is loaded in the ODD is used for mounting a module for wirelessly transmitting power, it is possible to reduce the inconvenience of carrying a wireless charger separately or connecting the wireless charger to an external power source. And, it can be very convenient because a smart terminal can be charged easily in a laptop computer wirelessly.

Figure 1:
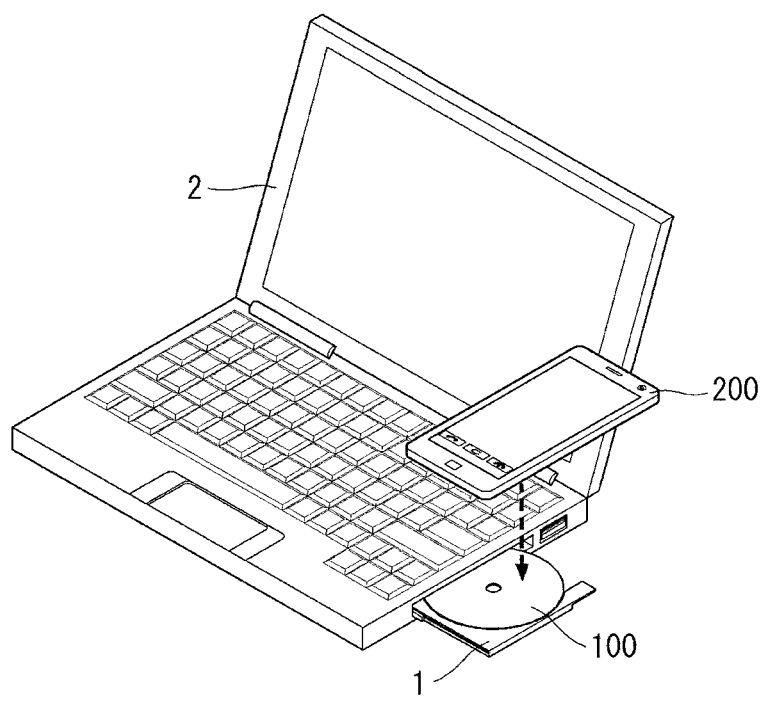
FIG. 1 illustrates a wireless power transmission module, which is loaded on an optical disk drive mounted on a laptop computer, wirelessly transmitting power to a smart terminal according to an embodiment of the present invention.

FIG. 1 illustrates a wireless power transmission module, which is loaded on an optical disk drive mounted on a laptop computer, wirelessly transmitting power to a smart terminal according to an embodiment of the present invention.

In the present invention, a configuration is proposed in which a module 100 in the form of an optical disk which is capable of wirelessly transmitting power is loaded on the tray of an ODD 1, a smart terminal 200 capable of be wirelessly charged is placed on the tray which is opened (protruded to the outside of a laptop computer 2), and power is wirelessly transmitted from the module 100 to the smart terminal 200. In addition, when performing the function of the ODD 1, the wireless power transmission module 100 can be pulled out of the tray and the disk can be inserted therein.

Figure 2:
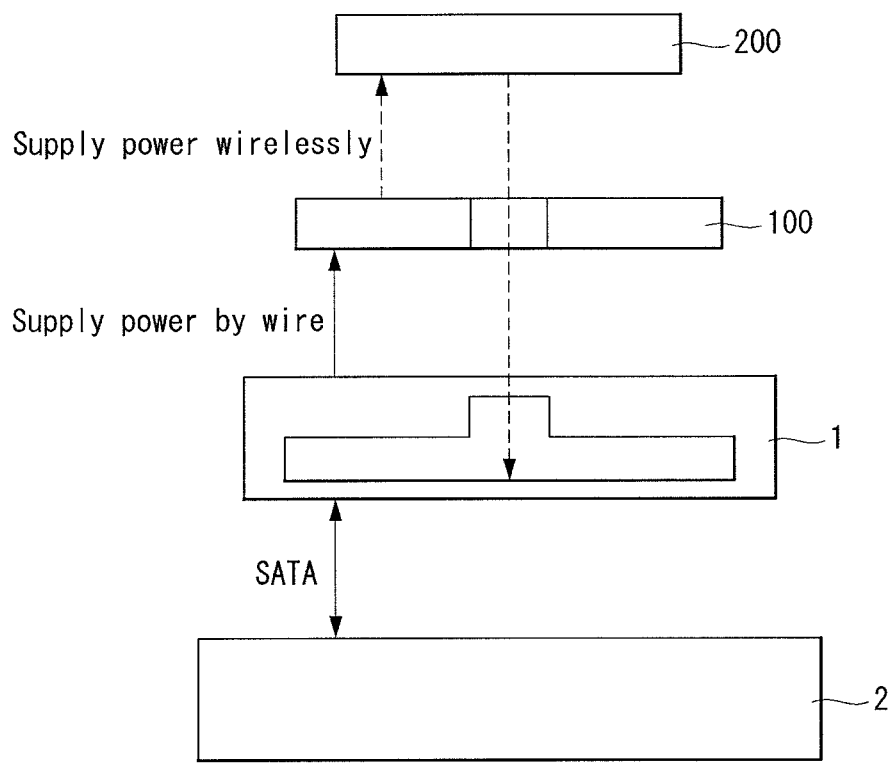
FIG. 2 illustrates a connection relationship for power transmission between a laptop computer, an optical disk drive, a wireless power transmission module, and a smart terminal.

FIG. 2 illustrates a connection relationship for power transmission between a laptop computer, an optical disk drive, a wireless power transmission module, and a smart terminal. The ODD 1 and the laptop computer 2 are connected via, for example, SATA (Serial Attachment), to exchange power, data, and commands. The ODD 1 supplies electric power to the wireless power transmission module 100 loaded on the tray by wire (extending power from the SATA signal line). The wireless power transmission module 100 can wirelessly transmit power to the smart terminal 200 mounted thereon. The wireless power transmission module 100 may directly receive power from the laptop computer 2 or from the outside via an AC adapter instead of receiving power from the laptop computer 2 via the ODD 1.

Figure 3:
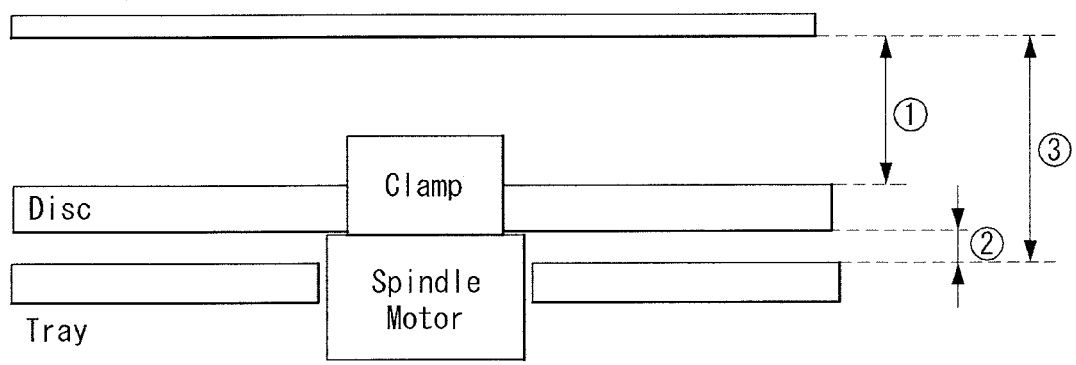
FIG. 3 illustrates a space in which an optical disk is seated in an optical disk drive built in a laptop computer.

FIG. 3 illustrates a space in which an optical disk is seated in an optical disk drive built in a laptop computer.

The slim-type ODD in which the tray equipped with a turn table and an optical pick-up slides into a body constitutes the body through the upper case (or cover) and the lower case (or main chassis). The tray on which an optical disk is seated is installed to be slidable in the main chassis and inserted into the space formed between the main chassis and the upper case, and can be drawn out from the body. The tray includes a spindle motor for rotating a mounted optical disk and a clamp is mounted on the spindle motor to clamp the optical disk.

In FIG. 3, the reference numeral 1 denotes a space between the upper surface of the disk and the upper case, 2 denotes a space between the lower surface of the disk and the tray, and 3 denotes a space between the tray and the upper case. The space between the upper case and the tray (3 in FIG. 3) defines the thickness of the wireless power transmission module, which is required to be about 4.0 mm or less.

In addition, since the wireless power transmission module must be inserted into the ODD body in a state of being mounted on the tray of the ODD, the outer size is limited to an optical disk shape. As long as the wireless power transmission module can be seated on the tray, a polygon such as a square or various other shapes is possible.

Figure 4:
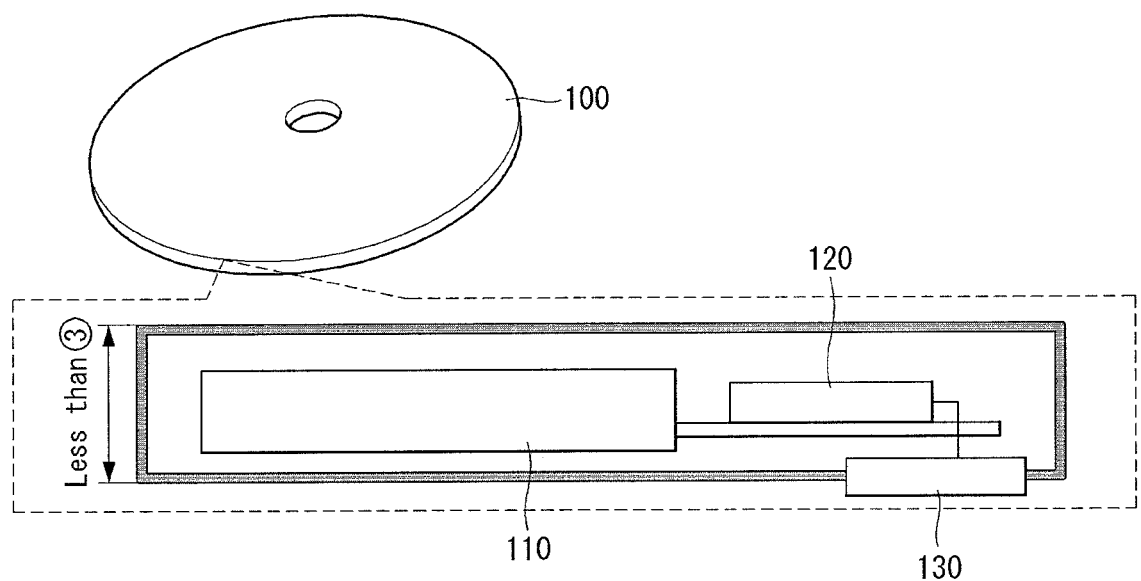
FIG. 4 shows a configuration of a disk-shaped wireless power transmission module.

FIG. 4 shows a configuration of a disk-shaped wireless power transmission module. The wireless power transmission module 100 according to the present invention is required to dispose a transmission coil (Tx coil) 110 and a transmission circuit (Tx circuit) 120 inside a disk shape of the thickness limited by the gap between the upper case of the ODD 1 and the tray (3 in FIG. 3). And, a power connector 130 for receiving power from the ODD 1 may be connected to a Tx circuit unit 120.

Figure 5:
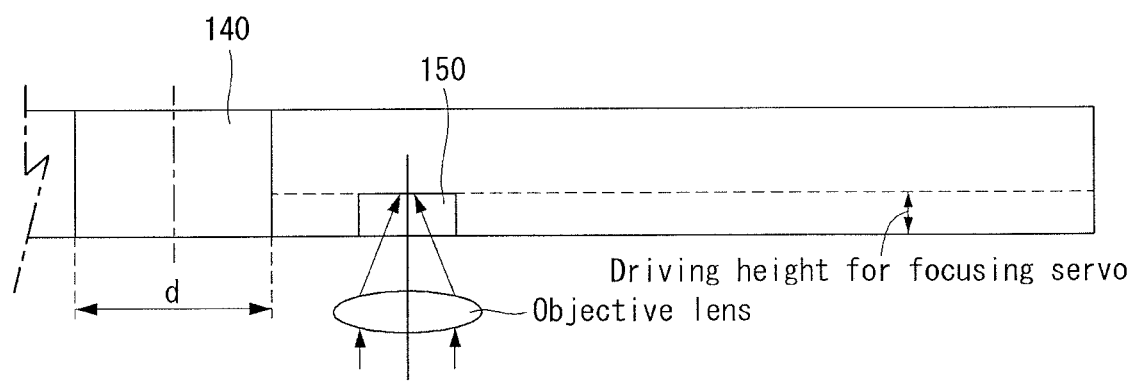
FIG. 5 shows a clamp hole for placing the wireless power transmission module on a tray of an optical disk drive and a reflection area necessary for module recognition.

FIG. 5 shows a clamp hole for placing the wireless power transmission module on a tray of an optical disk drive and a reflection area necessary for module recognition.

It is necessary for the ODD 1 to discriminate an object accommodated in the ODD main body and switch an operation mode to the wireless power transfer standby mode when the accommodated object is a wireless power transmission module instead of an optical disk. Otherwise, when a tray is closed, a retry mode may be repeatedly performed according to the disk presence identification and disk discrimination algorithms to generate noise or malfunction.

Since the clamp for fixing a disk is disposed on the tray of the ODD 1, in the present invention, a clamp hole 140 is provided at the center of the wireless power transmission module, as shown in FIG. 5. The diameter d of the clamp hole 140 is made larger than the clamp diameter of the tray so that even if the wireless power transmission module 100 is mounted on the tray, it is not fixed to the clamp so that the wireless power transmission module 100 does not rotate when the spindle motor rotates.

In addition, a recognition area (or a reflection part) 150 may be provided in an inner circumference of the disk, that is at a position corresponding to a recognition area where the disk information of an optical disk is contained so that an optical pick-up can recognize the area in a disk recognition process. The reflection part 150 may be formed of a material having a light reflectivity similar to that of a general disk, which may enable the optical pick-up to obtain a focusing error (FE) signal of a S-curve shape as when a disk exists while the optical pick-up swings an objective lens in the upward and downward directions in the process of determining whether or not the disk exists.

Figure 6A:
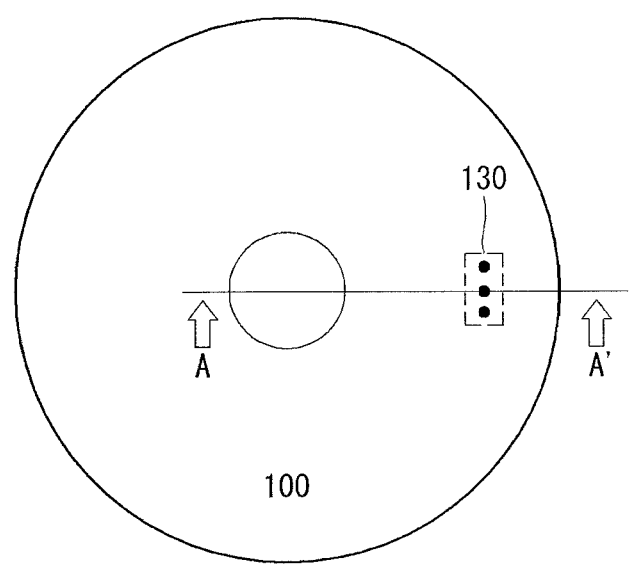
FIGS. 6a and 6b illustrate a connector for supplying power to a wireless power transmission module.
Figure 6B:
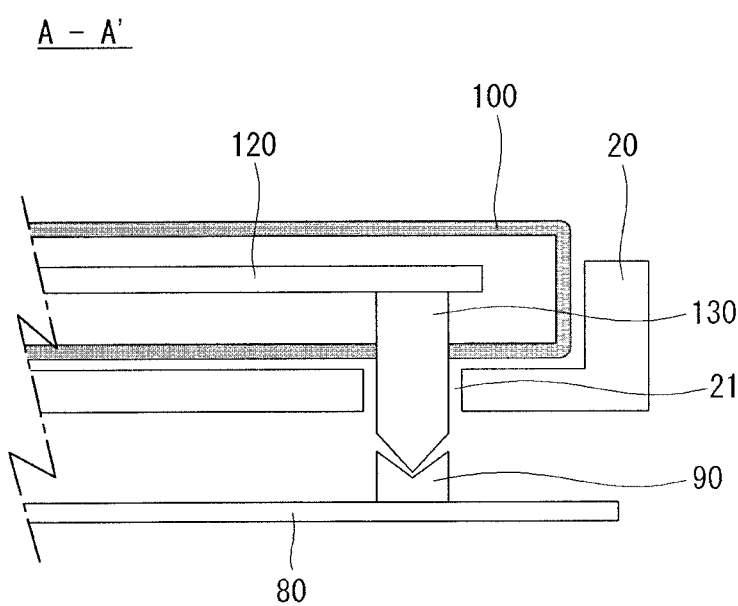
Figure 7:
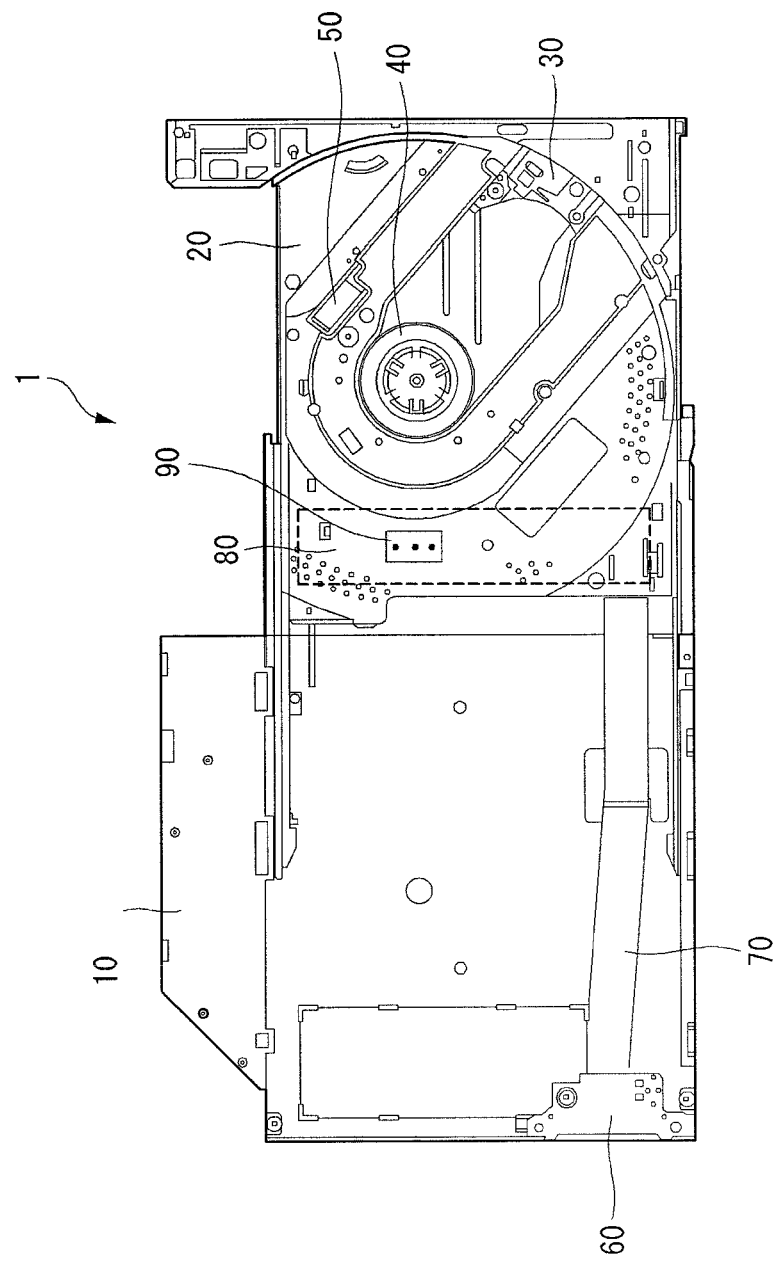
FIG. 7 shows a configuration of an optical disk drive for supplying power to a wireless power transmission module mounted on a tray.

FIGS. 6*a* and 6*b* illustrate a connector for supplying power to a wireless power transmission module, and FIG. 7 shows a configuration of an optical disk drive for supplying power to a wireless power transmission module mounted on a tray.

The wireless power transmission module 100 of the present invention is of in a disk shape, operates while being loaded on a tray of the ODD 1, detects an electronic device (receiving device) to which power is to be transmitted and wirelessly transmits power to the detected device. But power must be supplied to the wireless power transmission module 100 from the outside by wire.

In order to receive electric power from the ODD 1 by wire in a state where the wireless power transmission module 100 is mounted on the tray of the ODD 1, a first connector 130 for connecting a power source may be provided in a protruded state on a lower surface of the module 100 to be mounted on the tray. The tray 20 may be provided with a tray hole 21 capable of accommodating the protruded first connector 130 to a position corresponding to the first connector 130.

The first connector 130 protruding below the tray 20 through the tray hole 21 may engage with the second connector 90 which is provided on a printed circuit board (PCB) 80 disposed below the tray 20 and projects upwardly toward the tray 20 to receive power and supply the power to the Tx circuit unit 120.

The wireless power transmission module 100 is mounted on the tray 20 of the ODD 1 so that the first connector 130 is inserted into the tray hole 21 and the first connector 130 is connected to the second connector (90), and provided with power required for operation by wire from the PCB 80.

The optical disk drive (ODD) 1 shown in FIG. 7 is drawn on the upper side of the spindle motor 40 in a state the tray 20 is opened, and comprises the case 10 forming a body and the tray 20 which an optical disk or the wireless power transmission module 100 is loaded on and which is inserted into or drawn out of the body in a sliding manner.

The tray 20 includes an optical pick-up 30 for recording data on or reading data from an optical disk by emitting a laser beam onto the optical disk, a spindle motor 40 for rotating the optical disk, and a sled motor 50 for transferring the optical pick-up 30 in the radial direction of the optical disk.

A circuit board (PCB) 80 for driving the operation of the ODD 1 is mounted on the lower surface of the tray 20 and a second connector (90) for supplying power to the wireless power transmission module 100 loaded on the tray 20 is attached to the circuit board 80.

The case 10 is provided with a SATA connector 60 for sending and receiving data, power, and commands to and from a host to which the ODD 1 is mounted, that is, a laptop computer 2, and a flat flexible cable FFC for connecting the circuit board 80, mounted on and moving together with the tray 20, to the SATA connector 60. The FFC 70 is folded when the tray 20 is pulled into the ODD body and unfolded when the tray 20 is pulled out of the ODD body.

The ODD 1 is powered through the battery or adapter of the laptop computer 1 via the SATA connector 60, and a power supply line is formed from the SATA connector 60 to the second connector 90 of the circuit board 80 via the FPCB 70.

Figure 8:
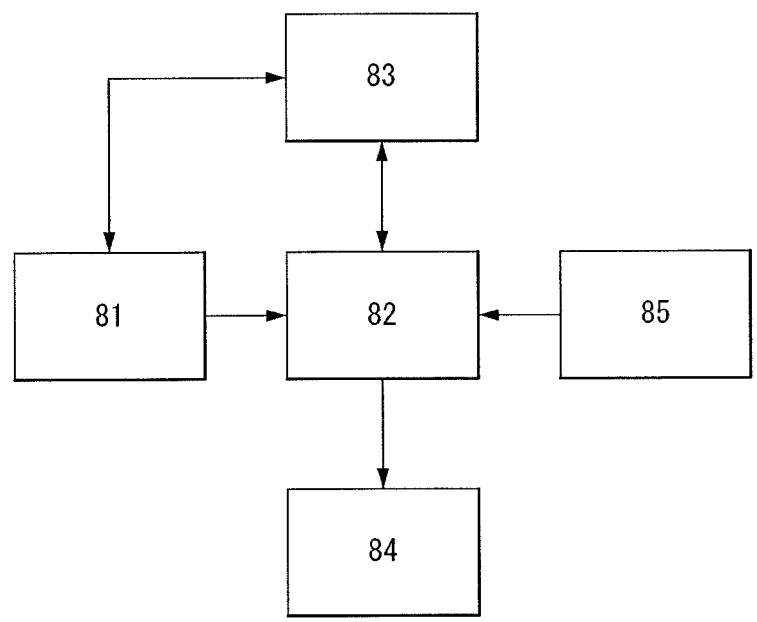
FIG. 8 is a functional block diagram showing a configuration of an optical disk drive.

FIG. 8 is a functional block diagram showing a configuration of an optical disk drive.

The ODD 1 performs an operation of writing data on or reading data from an optical disk loaded on the tray 20, or supplying power to the wireless power transmission module 100 seated on the tray. To perform such operations, the ODD 1 may be configured to comprise an interface 81 for connecting with the laptop computer 2 as a host, a control unit 82 for controlling each component to perform the overall operation of the ODD 1, a drive unit 83 for driving an optical pick-up 30, a spindle motor 40 and a sled motor 50 mounted in the tray 20 for reading or writing an optical disk, a power supply unit 84 for managing the power required for the operations of the ODD 1 and supplying or disconnecting power to the wireless power transmission module 100, and a tray 20, and an opening/closing sensor 85 for detecting whether the tray 20 is pulled in or pulled out of the ODD body.

The opening/closing sensor 85 is provided on the rear surface of the case 10 in the form of a switch, and may output a signal indicating that the tray 20 is closed when the switch is pressed after the tray 10 is closed.

When the tray 20 is closed or the laptop computer 2 is changed from a sleep mode to an operating mode, the control unit 82 controls the optical pickup 30 and the spindle motor 40 through the driving unit 83 and determines whether an optical disk is seated in the tray 20 or the wireless power transmission module 100 is seated. The control unit 82 controls the drive unit 83 to perform an operation of writing or reading an optical disk when determining that the optical disk is seated in the tray 20, and controls the power supply unit 84 to supply power to the second connector 90 when determining that the wireless power transmission module 100 is seated in the tray 20

The control unit 82 determines whether an optical disk or the wireless power transmission module 100 is seated in the tray 20 only when the tray 20 is closed. This is because it is necessary to drive the optical pickup 30 and the spindle motor 40 in order to determine an object loaded on the tray 20 and the optical pickup 30 and the spindle motor 40 must not be driven in a state in which the tray 20 is opened.

The controller 82 controls the power supply unit 84 to supply power to the second connector 90 only when a signal is input indicating that the tray is opened from the opening/closing sensor 85 in a state in which the wireless power transmission module 100 is mounted on the tray 20. This is because the wireless power transmission module 100 can wirelessly supply power to a smart terminal 200 while the tray 20 is opened and pulled out of the laptop computer 2.

Figure 9:
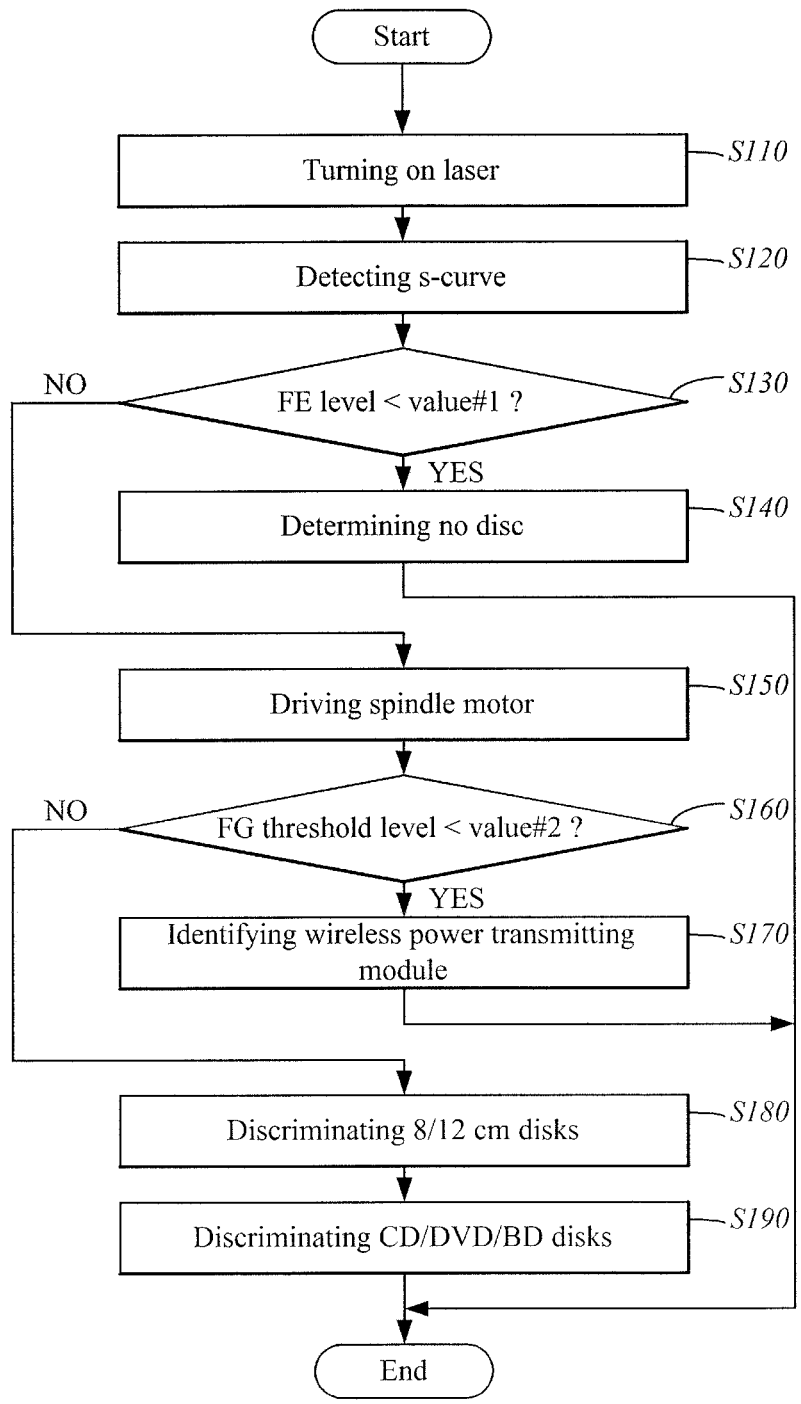
FIG. 9 is a flowchart showing an operation of determining whether or not a wireless power transmission module is mounted on a tray, FIG. 10 conceptually shows a circuit configuration of a power conversion unit of a wireless power transmission module for wirelessly transmitting power in an electromagnetic induction manner.

FIG. 9 is a flowchart showing an operation of determining whether or not a wireless power transmission module is mounted on a tray.

When receiving a signal indicating that the tray 20 is closed from the opening/closing sensor 85 or receiving a signal from the interface 81 indicating that the host is switched to the operating mode, the control unit 82 performs a process of discriminating the presence or absence of a disk and recognizing what kind of disk it is.

The control unit 82 controls the driving unit 83 to turn on the laser diode of the optical pickup 30, that is turns on at least one of the laser diode for CD, the laser diode for DVD, and the laser diode for BD (S110).

Thereafter, the control unit 82 controls the driving unit 83 to swing the actuator supporting the objective lens in the optical pickup 30 in the up-and-down direction and detects an S-curve corresponding to the focusing error FE signal using a reflected signal (S120). If the FE signal is smaller than a predetermined first value value #1 (YES in S130), the control unit 82 determines that nothing is seated on the tray 20 (No disk) (S140). Otherwise (NO in S130), the control unit 82 determines that an optical disk or the wireless power transmission module 100 is seated on the tray 20.

The reflection part 150 is formed in the surface contacting with the tray 20 in the wireless power transmission module 100. When the wireless power transmission module 100 is seated in the tray 20, the laser beam emitted from the optical pick-up 30 is reflected by the reflection part 150 and is incident on the detector of the optical pick-up 30 to generate a focusing error signal. By detecting the s-curve from the focusing error signal, the control unit 82 can determine whether an optical disk or the wireless power transmission module 100 is seated on the tray 20.

The control unit 80 controls the drive unit 83 to drive the spindle motor 40 (S150) and compares the FG signal level generated in the spindle motor 150 with a predetermined second value (value #2) (S160). If the FG signal level is smaller than the predetermined second value (YES in S160), the control unit 80 recognizes the object placed on the tray 20 as the wireless power transmission module 100 (S170) and enters a wireless power transmission standby mode. Otherwise (NO in S160), the control unit 80 recognizes the object placed on the tray 20 as an optical disk, performs an operation of distinguishing 8/12 cm disks (S180), and performs an operation of distinguishing CD/DVD/BD disks (S190).

When the wireless power transmission module 100 is seated on the tray 20, since the diameter of the clamp hole 140 of the wireless power transmission module 100 is larger than the diameter of the clamp provided on the spindle motor 40 of the tray 20, the wireless power transmission module 100 does not rotate even when the spindle motor 40 is driven and thus the FG signal generated in the spindle motor 40 is different from the FG signal when an optical disk is fixed to the clamp and rotated. By using this point, it is possible to discriminate whether the object placed on the tray 20 is an optical disk or a wireless power transmission module 100, and an 8 cm disk and a 12 cm disk can be distinguished on a similar principle.

When determining that the wireless power transmission module 100 is seated on the tray 20, the controller 80 controls the power supply unit 84 to supply power to the second connector 90 even if the tray 20 is opened, so that a user can place a smart terminal 200 on the wireless power transmission module 100 and charge the wireless terminal 200 wirelessly.

On the other hand, whether or not the wireless power transmission module 100 is seated on the tray 20 can be confirmed by a method different from the method of FIG. 9. For example, each of the first connector 130 and the second connector 90 may be provided with a separate recognition pin as well as a pin for power connection. When the wireless power transmission module 100 is seated on the tray 20 and the first connector 130 and the second connector 90 are connected to supply power to the wireless power transmission module 100, the wireless power transmission module 100 may transmit identification information via the recognition pin of the first connector 130, and the control unit 80 of the ODD 1 may determine that the wireless power transmission module 100 is seated on the tray 20 based on the identification information received through the recognition pin of the second connector 90.

The control unit 82 controls the power supply unit 84 to supply power to the second switch 90 when the tray 20 is closed or the laptop computer 2 is changed from a sleep mode to the operating mode. The control unit 82 may determine that the wireless power transmission module 100 is seated in the tray 20 when the identification information is received via the recognition pin of the second connector 90, and control the power supply unit 84 to supply power to the second switch 90 when a signal is input indicating that the tray is opened.

Or, the control unit 80 of the ODD 1 may sense the potential change of the recognition pin of the second connector 90 and judge that the wireless power transmission module 100 is seated on the tray 20. This is because the potential of the recognition pin of the second connector 90 changes when the first connector 130 and the second connector 90 are connected.

Next, a principle in which wireless power transmission module 100 wirelessly transmits power to the smart terminal 200 as a receiving device will be described.

The wireless power transmission module 100 wirelessly transmits power to a smart terminal 200 in an inductive coupling manner based on the electromagnetic induction phenomenon by a wireless power signal. That is, the alternating current flowing in a primary coil changes a magnetic field, which can transmit power to a secondary coil by inducing a current to the secondary coil in accordance with the electromagnetic induction phenomenon.

When an intensity of the current that flows on the primary coil of the wireless power transmitting module 100 changes, a magnetic field that passes through the primary coil or a transmission coil (Tx coil) is changed by the current and the changed magnetic field generates induced electromotive force to the secondary coil or reception coil (Rx coil) in the smart terminal 200.

When the wireless power transmitting module 100 and the smart terminal 200 are placed so that the primary coil of the wireless power transmitting module 100 and the reception coil of the smart terminal 200 come close to each other and the wireless power transmitting module 100 changes the current of the primary coil, the smart terminal 200 supplies power to a load such as a battery by using the electromotive force induced to the reception coil.

Figure 10:
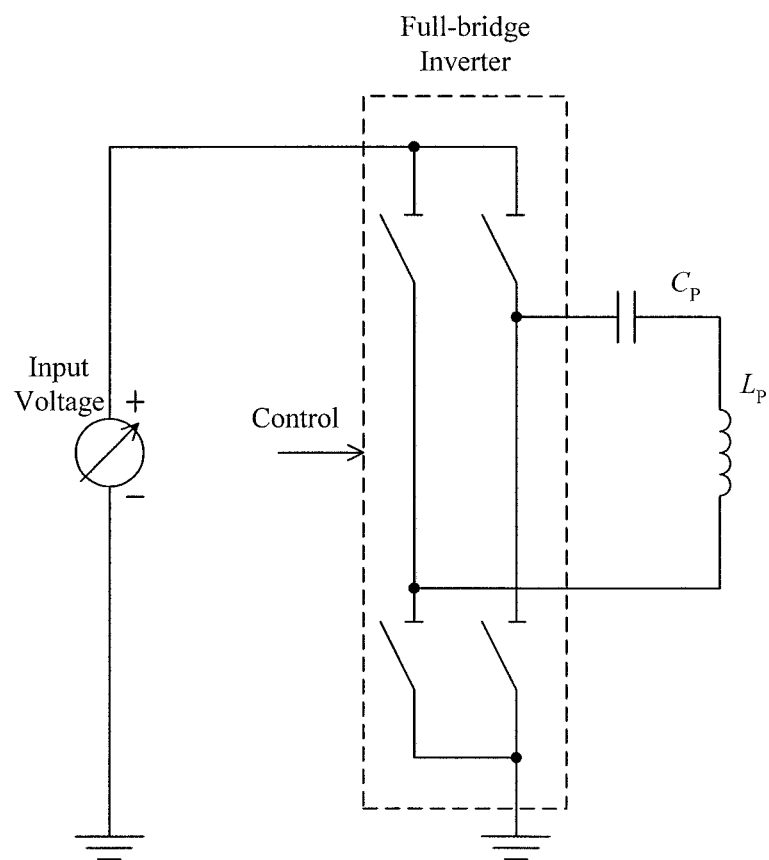

FIG. 10 conceptually shows a circuit configuration of a power conversion unit of a wireless power transmission module for wirelessly transmitting power in an electromagnetic induction manner.

The wireless power transmitting module may comprise a power supply, a power converter comprising an inverter and a resonance circuit, and a Tx coil. The power supply may be a voltage source or a current source. The power converter and the Tx coil convert the power supplied from the power supply into the wireless power signal and transfer the wireless power signal to a receiving device. And, the wireless power signal is formed in the form of a magnetic field or an electromagnetic field having a resonance characteristic. The Tx coil that generates the wireless power signal may be included in the resonance circuit.

The inverter converts a DC input into an AC waveform having desired voltage and a desired frequency through switching elements and a control circuit. In FIG. 10, a full-bridge inverter is illustrated and other types of inverters including a half-bridge inverter, and the like are available.

The resonance circuit is configured to comprise a Tx coil or a primary coil Lp and a capacitor Cp that will transmit power by a magnetic induction scheme. The primary coil and the capacitor decide a primary resonance frequency of power transmission. The primary coil forms the magnetic field corresponding to the wireless power signal with a change of current and may be implemented in a disk spiral shape or a cylindrical solenoid shape.

The AC current converted by the inverter drives the resonance circuit, and as a result, the magnetic field is formed at the primary coil. The inverter may generate AC having a frequency close to the resonant frequency of the resonance circuit to increase transmission efficiency of a transmitting device. The inverter may be controlled to change transmission efficiency of the transmitting device.

Figure 11:
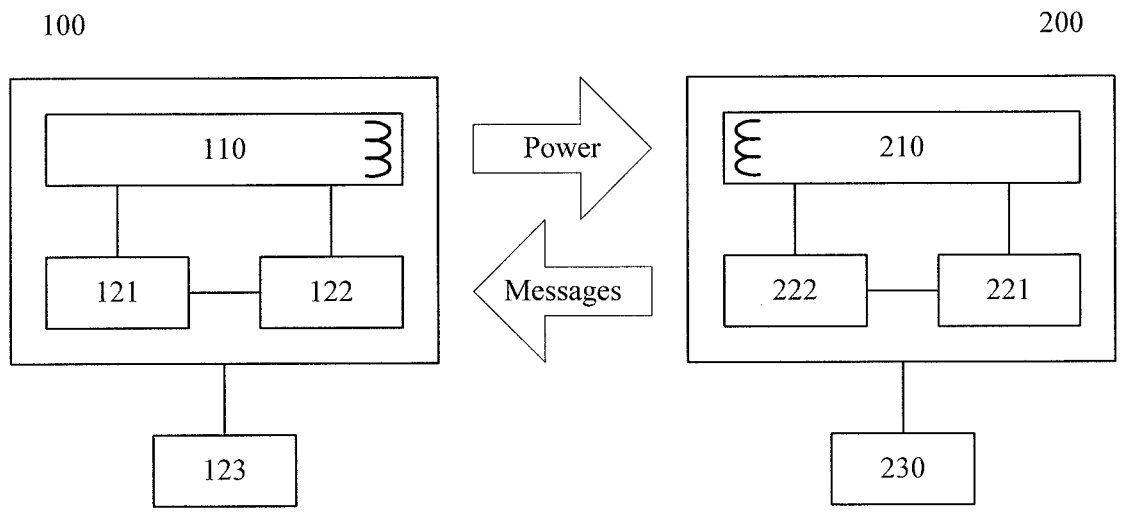
FIG. 11 illustrates a configuration in which a wireless power transmission module and a receiving device transmit and receive messages and power.

FIG. 11 illustrates a configuration in which a wireless power transmission module and a receiving device transmit and receive messages and power.

Since the power converter just transmits power unilaterally regardless of a reception state of the receiving device, a configuration for receiving a feed-back associated with the reception state from the receiving device is required in the wireless power transmitting module in order to transmit power to fit the reception state of the receiving device.

The wireless power transmitting module 100 may comprise a Tx coil 110, a power converter 121, a transmitter communication unit 122, and a transmitter power supply unit 123. And, the smart terminal which is the receiving device may comprise a Rx coil 210, a power receiver 221, a receiver communication unit 222, and a charging unit 230. The power converter 121, the transmitter communication unit 122, and the transmitter power unit 123 may constitute a Tx circuit unit 120.

The power converter 121 may be configured to comprise the inverter and the resonance circuit of FIG. 10, and may further include the circuit that may control characteristics such as a frequency, a voltage, a current, and the like used for forming the wireless power signal.

The transmitter communication unit 122 connected to the power converter 121 may detect a power control message by demodulating the wireless power signal modulated by the smart terminal 200 that wirelessly receives the power from the transmitting module 100 in the magnetic induction scheme, decide at least one characteristic of the operating frequency, voltage, and current of the power converter 121 and control the power converter 121 to generate a wireless power signal suitable for the message.

An induced electromotive force is generated in accordance with a change in the magnetic field generated in the Tx coil 110 of the transmitting module 100, so the power receiving unit 221 including a matching circuit and a rectifying circuit may generate and output a direct current from an alternating current flowing through the Rx coil 210.

The receiver communication unit 220 connected to the power receiver 221 changes the wireless power signal between the transmitting module and the smart terminal to transmit a power control message to the transmitting module by adjusting the load of the power receiver including a resistive load at DC and a capacitive load at AC. The receiver communication unit 220 may measure an output of the power receiver 221 in a current or voltage form and transmit a power control message to the wireless power transmitting module 100 based on the measured output. The message may instruct the wireless power transmitting module 100 to start or end transmitting the wireless power signal and to adjust characteristics of the wireless power signal.

The wireless power signal formed by the power converter 110 of the transmitting module is received by the power receiver 221. The receiver communication unit 222 may perform a modulating process that changes a wattage received from the wireless power signal by changing a reactance. When the wattage received from the wireless power signal is changed, the current and/or voltage of the power converter 121 which forms the wireless power signal is also changed, and the transmitter communication unit 122 may perform a demodulation process by sensing the change in current and/or voltage of the power converter 121.

The receiver communication unit 222 generates a packet including a message to be transmitted to the wireless power transmitting module 100 and modulates the wireless power signal to include the packet. The transmitter communication unit 122 detects the power control message by decoding an extracted packet. The receiver communication unit 222 may transmit a message for requesting the change in characteristic of the wireless power signal based on the wattage received through the power receiver 221 in order to control the power to be received.

The wireless power transfer module 100 performs an interaction with the smart terminal 200 to supply power wirelessly. The interaction may comprise four steps of selection, ping, identification & configuration, and power transfer.

The selection step is a step for the transmitting apparatus to discover an object on an interface surface of the wireless power transfer module 100. The ping step is a step for verifying whether the object includes a receiving device. The identification & configuration step as a preparatory step for transmitting power to the receiving device is a step for receiving appropriate information from the receiving device and making a power transfer contract with the receiving device. And, the power transfer step is a step for actually transmitting power to the receiving device wirelessly by the interaction between the transmitting module and the receiving device.

When power is supplied from the ODD 1, the wireless power transmission module 100 automatically interacts with the smart terminal 200 to wirelessly transmit power to the smart terminal 200 placed on the module.

Figure 12:
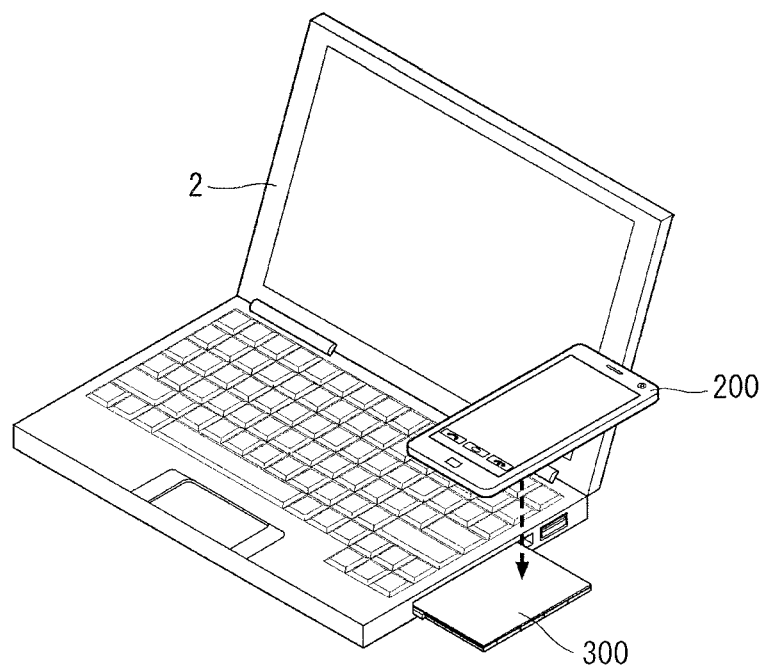
FIG. 12 illustrates a wireless power transmission module, which has a tray shape to be housed in a laptop computer, wirelessly transmitting power to a smart terminal according to another embodiment of the present invention.

FIG. 12 illustrates a wireless power transmission module, which has a tray shape to be housed in a laptop computer, wirelessly transmitting power to a smart terminal according to another embodiment of the present invention.

Recently, high-priced laptop computers have been introduced in an ultra-slim form to reduce the thickness thereof in order to compete with a tablet PC or the like, thereby eliminating an ODD from a main body. Such an ultra slim laptop computer may embody a retractable wireless power transmission module 300 in the form of a tray of an ODD in the laptop computer 2 as shown in FIG. 12 to implement a wireless power transmission function.

In this case, since the retractable wireless power transmission module 300 does not include an ODD function, it is possible to manufacture the retractable wireless power transmission module 300 with a relatively small thickness, for example, a thickness of about 5 mm. The retractable wireless power transfer module 300 can add wireless power transfer capability to laptop computers without significantly impacting the design of the laptop computers in a slim design.

Thus, the wireless power transmission module may be mounted on a tray of an ODD in the form of a disk to embed the ODD in a laptop computer, or may be stored in a tray directly in a laptop computer, and transmit power wirelessly to a smart terminal while it is pulled out from the laptop computer. So, the inconvenience of carrying a charging module directly or connecting the charging module to a power source by wires is reduced, and the convenience of using the laptop computer alone to charge a smart terminal wirelessly is increased.

As described above, the embodiments of the present invention have been disclosed for illustrative purposes, and those skilled in the art may improve, change, replace, or add various other embodiments without departing from the technical spirit and scope of the present invention disclosed in the attached claims.

What is claimed is:

1. An optical disk drive for wireless power transmission, comprising:
   a tray on which an optical disk is to be seated;
   a driving unit for rotating the optical disk to be seated on the tray and reading or writing the optical disk;
   a wireless power transmitting module to be seated on the tray and comprising a primary coil and a transmitting circuit unit;
   a power supply unit for supplying power;
   and a controller for controlling the power supply unit to supply power to the wireless power transmitting module when determining that the wireless power transmitting module is seated on the tray,
   wherein the controller controls the driving unit to drive a spindle motor to rotate an object seated on the tray, and determines whether the wireless power transmitting module is seated on the tray based on a signal reflected from the object and a second signal generated from the spindle motor.

2. The optical disk drive of claim 1, wherein the controller controls the power supply unit to supply power to the wireless power transmitting module only when the tray is open in a state in which the wireless power transmitting module is seated on the tray.

3. The optical disk drive of claim 1, wherein the controller determines whether the wireless power transmitting module is seated on the tray only in a state in which the tray is closed.

4. The optical disk drive of claim 1, wherein the wireless power transmitting module comprises a reflection area for reflecting a light emitted from an optical pick-up at a predetermined thickness from a surface contacting the tray when the wireless power transmitting module is seated on the tray.

5. The optical disk drive of claim 4, wherein the reflection area is formed in a predetermined radial range and a predetermined tangential angle range in which an objective lens included in the optical pick-up is placed when the optical pick-up moves most inward.

6. The optical disk drive of claim 1, wherein the wireless power transmitting module comprises a clamp hole a diameter of which is larger than that of a clamp of the spindle motor.

7. The optical disk drive of claim 1, wherein the wireless power transmitting module comprises a first connector for receiving power which protrudes from a surface contacting the tray, the tray is provided with a tray hole in a position corresponding to the first connector, and a second connector is mounted on a circuit board disposed below the tray to face the tray so as to engage the first connector.

8. An optical disk drive for wireless power transmission, comprising:
   a tray on which an optical disk is to be seated;
   a driving unit for rotating the optical disk to be seated on the tray and reading or writing the optical disk;
   a wireless power transmitting module to be seated on the tray and comprising a primary coil and a transmitting circuit unit;
   a power supply unit for supplying power;
   and a controller for controlling the power supply unit to supply power to the wireless power transmitting module when determining that the wireless power transmitting module is seated on the tray,
   wherein the wireless power transmitting module comprises a first connector for receiving power which protrudes from a surface contacting the tray, the tray is provided with a tray hole in a position corresponding to the first connector, a second connector is mounted on a circuit board disposed below the tray to face the tray so as to engage the first connector, and each of the first and second connectors includes a recognition pin, and
   wherein when the tray is closed, the controller controls the power supply unit to supply power to the second pin, and determines that the wireless power transmitting module is seated on the tray if identification information is received from the recognition pin.

9. The optical disk drive of claim 8, wherein when the tray is open in a state in which the wireless power transmitting module is seated on the tray, the controller controls the power supply unit to supply power to the wireless power transmitting module via the second connector.

10. The optical disk drive of claim 1, wherein the optical disk drive is built into a laptop computer.

* * * * *